Patented June 30, 1942

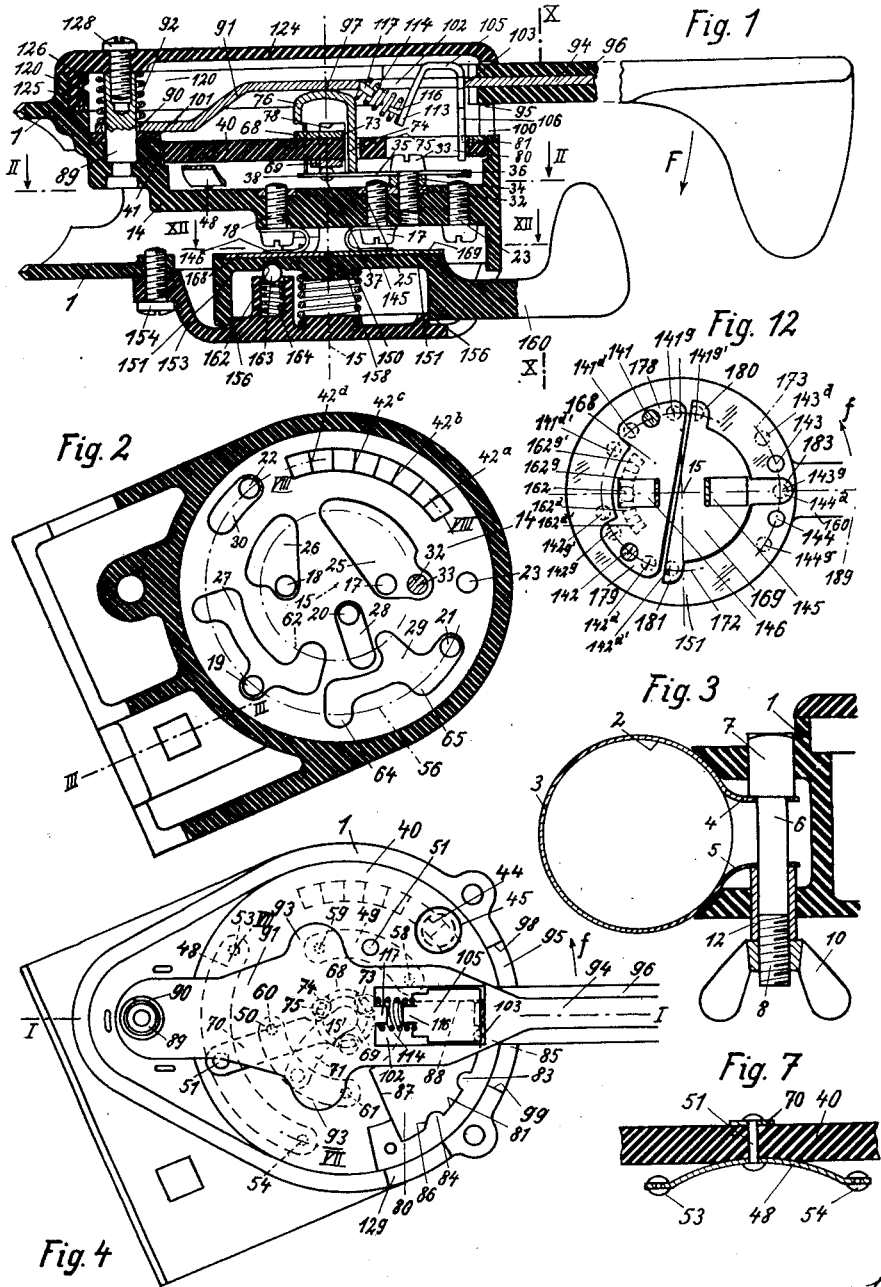

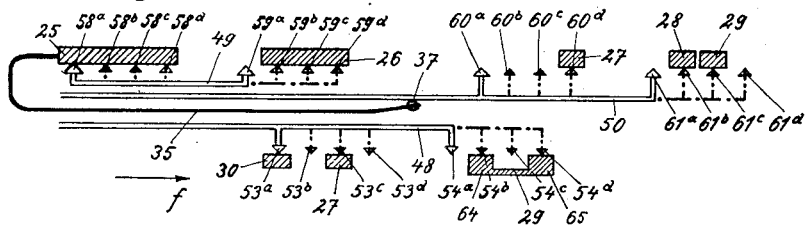
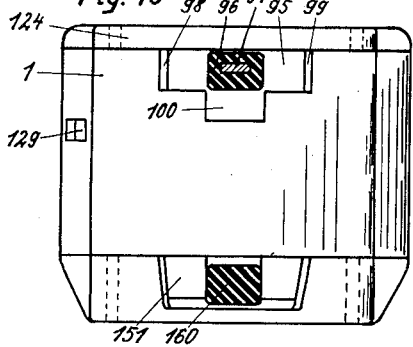
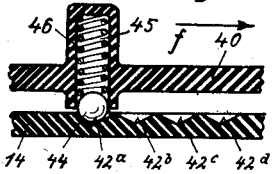
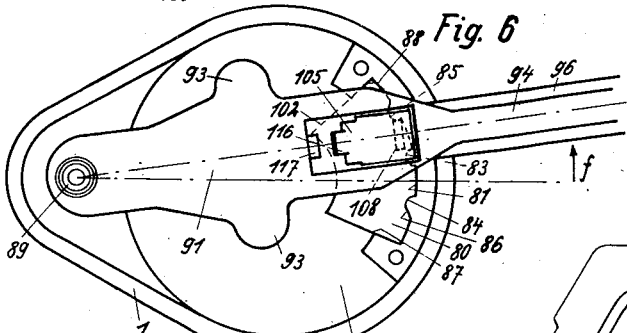
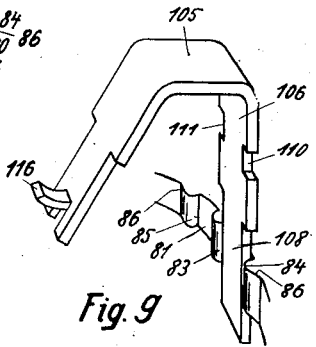

2,288,207

UNITED STATES PATENT OFFICE 2,288,207

ELECTRICAL SWITCH, PARTICULARLY FOR CONTROL OF WARNING AND LIGHTING DEVICES FOR VEHICLES

Henri Paul Marcel Quillery, La Garenne-Colombes, France

Application January 24, 1938, Serial No. 186,702
In France January 28, 1937

11 Claims. (Cl. 200—6)

My invention relates to an electrical switch more particularly for the control of the warning and lighting devices used by vehicles circulating on the road.

The warning is advantageously and often compulsorily effected at night by means of luminous signals which are produced in general by the variation of the light emitted by the headlamps of the vehicle.

My invention has for its main object an electrical switch, which is actuated by a manually operable lever which is always in an invariable position in which it returns after each control has been effected and is so arranged that at night, the same gesture of the driver for actuating said lever actuates a luminous warning signal by modifying the lighting at the front of the vehicle, and optionally, in the daytime, a sound warning signal, these two warning signals being called town warning signals, an additional displacement of said lever in the same direction always actuating a sound warning signal called road warning signal.

In the case in which the police regulations forbid the use of any sound warning signal in town, the above-mentioned town warning signal is eliminated, and the afore-mentioned gesture of the driver for actuating the luminous warning signal at night does not produce any effect during the day, the driver having the road sound warning signal constantly available.

On the other hand, in the case in which only one sound warning signal exists which serves both for town and road use, the control of this single warning signal is connected to the two controls which will be explained hereinafter as separate controls.

Preferably, this electrical switch is connected with the control of the headlamps of the vehicle in such a manner that while the lever is actuated, the luminous warning signal is substituted for the previously existing permanent lighting.

Another object of my invention is a switch which is adapted to control both the permanent lighting and the warning means of an automobile vehicle and in which the member for controlling the permanent lighting modifies the nature of the warning signal arranged in the circuit which is closed by the lever controlling the warning means.

A further object of my invention is a lighting control switch comprising a single lever which is so arranged that its displacement in either direction causes the switching from one permanent lighting combination to the next, and then automatically returns to its inoperative position.

A still further object of my invention is a switch for controlling the auxiliary elements of the automobile vehicle, such as the parking lights and the direction indicators, and which can advantageously be combined with the lighting control switch so as to form with the latter a unitary device.

Other objects and characteristics of my invention will moreover become apparent from the ensuing description taken with reference to the accompanying drawings which are given solely by way of example and in which:

Fig. 1 is a sectional elevation, in section along the line I—I of Fig. 4 of a switch according to the invention;

Fig. 2 is a section along the line II—II of Fig. 1;

Fig. 3 is a partial section along the line III—III of Fig. 2;

Fig. 4 is a plan view of the switch, the cover being removed;

Fig. 5 is a plan view of the inside of the cover;

Fig. 6 is a partial view similar to Fig. 4 showing the switch at a different position, the spring acting on the pawl being eliminated;

Figs. 7 and 8 are partial sections on a large scale along the lines VII—VII and VIII—VIII of Figs. 4 and 2 respectively;

Fig. 9 is a perspective view of a detail;

Fig. 10 is a section along the line X—X of Fig. 1;

Fig. 11 is an explanatory diagram, and

Fig. 12 is a section along the line XII—XII of Fig. 1.

According to the embodiment shown, the switch is enclosed in a case 1 made of moulded plastic material and adapted to be fixed to the steering column 2 (Fig. 3) of an automobile vehicle by means of a metal collar 3 through the two ends 4 and 5 of which passes a rod 6 carried by the case 1, one end 7 of said rod 6 being square and the other end 8 threaded and cooperating with a wing nut 10 which bears on a sleeve 12 in contact with the end 5 and produces the clamping of the collar 3.

The bottom 14 of said case has the shape of a disc of which the axis is 15 and which carries on its outer face screws 17, 18, 19, 20, 21, 22, 23 on each of which is intended to be fixed a conducting wire not shown which places them in connection with one of the elements controlled by the switch, that is to say respectively, and in the order in which said screws are enumerated, with the battery, the rear or tail lights, the headlights (in general the bright filament of the headlamps), the front town light lamps, the courtesy headlights (in general the dim filament of the headlamps), the town sound-emitting warning system and the road sound-emitting warning system.

The screw 22 is eliminated or has no connection in the case in which there is no town sound-emitting warning device and the screws 22 and 23 are connected to each other when there is only a single sound-emitting warning device both for the town and the road.

Said screws pass through the entire thickness of said bottom 14 and, apart from the screw 23, the end of which projects from the inner face of the bottom and forms a stud, the other screws, viz.: 17, 18, 19, 20, 21, 22 are screwed into the contact bars 25, 26, 27, 28, 29 and 30 which are respectively embedded during moulding in the inner face of said bottom 14. The shape of said bars, which extend concentrically about the axis 15 of said bottom, is shown in Fig. 2 and the calculation of said shape will be explained hereinafter. The bar 25 has a tapped hole 32 which is extended through the bottom 14 and in which is screwed a screw 33 which clamps between its head and a washer 34 a resilient blade 35 of which the ends carry contacts 36 and 37 respectively, the contact 36 being located above the end of the screw 23 which forms a stud without being in its inoperative position in contact with said end and the other contact 37 forming a friction contact and arranged substantially on the axis 15. A movable plate 40 in the shape of a disc having its axis at 15 is arranged opposite the end 14 in a recess 41 of the case 1 so that it can rotate on itself. Said plate can take up relatively to the fixed bottom four positions $a$, $b$, $c$ and $d$ which are defined by four adjacent V-shaped recesses 42a, 42b, 42c, and 42d shown on a large scale in Fig. 8 and provided in the surface of said bottom along a segment of which the axis is 15. Said recesses co-operate with a ball 44 arranged in a recess 45 of the movable plate 40 and pressed resiliently in the direction of said bottom by a spring 46.

Three contact blades 48, 49 and 50 shown in dotted lines in Fig. 4 are carried concentrically with respect to the axis 15 by the plate 40 opposite the bottom 14. Said blades are each fixed, as shown in Fig. 7 with reference to the blade 48, by a central fixing rivet 51 and have two friction contacts one at each of their ends, on either side of their central fixing point on the plate. The two friction contacts 53 and 54 of the blade 48 move when the plate 40 rotates on itself, along the circle shown in chain dotted lines in Fig. 2, and the friction contacts 58, 59 and 60, 61 of the blades 49 and 50 respectively move on a circle 62 likewise shown in chain dotted lines in the same Fig. 2, said friction contacts being resiliently urged by the blade which bears them against the corresponding contact bars fixed on the bottom 14.

It can be seen that the circle 62 intersects respectively the bars 25, 26, 27, 28, and 29 so long as the circle 56 intersects respectively the bars 30, 27 and 29, this latter on two successive extensions 64 and 65. The relative positions of the friction contacts and of the bar portions which are in the zone which they sweep in their movements are shown diagrammatically in a developed view in Fig. 11, the positions of each friction contact corresponding to each of the four positions $a$, $b$, $c$, $d$ of the movable plate relatively to the fixed plate, which positions are determined by the notches 42a, 42b, 42c, 42d, being shown in continuous lines for the position $a$ and in chain dotted lines for the other positions, and being marked by the indices $a$, $b$, $c$ and $d$.

It can be seen that, for the four positions, the following connections are made: the friction contact 58 of the blade 49 remains, for the four positions $a$, $b$, $c$, $d$, in contact with the bar 25 which, as already explained, is connected to the battery, and the other friction contact 59 of said blade 49 is in contact with the plate 26 (rear lighting) for the positions $b$, $c$, and $d$; the resilient blade 50 is in connection, through the intermediary of the friction contact 61, for the position $b$ with the plate 28 (front town lamps) and, for the position $c$, with the plate 29 (courtesy or dim filament of the headlamps), and, through the intermediary of the friction contact 60, for the position $d$, with the plate 27 (bright filament of the headlamps). Similarly, the blade 48 is in connection for the position $a$ with the plate 30 (town sound-emitting warning device) through the intermediary of the friction contact 53, for the positions $b$ and $d$ with the plate 29 (courtesy headlamps) through the intermediary of the extensions 64 and 65 respectively of this latter plate and of the friction contact 54, and, for the position $c$, with the plate 27 (bright filament of the headlamps) through the intermediary of the friction contact 53.

On the upper and lower faces of the movable plate 40 are fixed respectively contact bars 68 and 69 which are circular, concentric about the axis 15 and have extensions 70 and 71 shown in Fig. 4, and placing in connection, the bar 68 with the resilient blade 48 and the bar 69 with the blade 50, the connection being effected through the intermediary of the fixing rivet of said blades. The bar 69 normally closes an electric circuit with the contact 37 of the resilient blade 35 forming a friction contact.

The circular bar 68 has three notches 73 distributed over its periphery, each of which surrounds a hole 74 provided in the plate 40 for passing the three feet 75 of a push button 76 which is concentric with said part 68 and substantially of the same diameter. Said three feet 75 are in contact with the part 38 of the blade 35. The head of said push button 76 has circular surface portions 78 which are parallel with the plate 40 and adapted to be pressed on the bar portion 68 when the push button is moved in the direction of the plate 40.

The movable plate 40 has a notch 80 therein in the shape of a segment which is limited on the outside by a circular surface 81 having its axis at 15 and being located above the screw 33 and having over a part of its height three equidistant teeth 83, 84 and 85, the two flanks of the medial tooth 83 being symmetrical and the outer flank 86 of each of the extreme teeth 84 and 85 being inclined in the direction of the medial tooth 83. The distance from each of the two extreme teeth 83 and 85 to the radial edge 87 and 88 respectively limiting the notch 80 of the corresponding side is equal to the distance of each of said teeth to the adjacent flank of the medial tooth 83.

The case 1 has between the fixing device on the steering column and the races 41 of the plate 40, a pivot 89 projecting on the other side of said plate 40 relatively to the bottom 14 and on which is threaded with a certain amount of play by means of a circular hole 90 a lever 91 which is pressed in the direction of the plate 40 by a spring 92 surrounding said pivot 89. Said lever 91 is formed by a metal sheet having substantially at its medial portion two symmetrical cheeks 93 and terminating by a part 94 projecting outside the case through a slot 95 and surrounded by a sheath 96 made of plastic material.

The slot 95 shown in Fig. 10 seen from the end is T-shaped and terminates laterally by two vertical walls 98 and 99 each respectively distant from the central portion 100 a length corresponding to the rotation of the plate 40 from one tooth to the next.

The lever 91 has a continuous portion in contact with the head of the push button 76 and has opposite the notch 80 a rectangular opening 102 which is symmetrical with respect to the axis of said lever and of which the extreme edge 103 extends opposite the circular surface 81. Through said opening 102 is threaded a pawl 105 shown in perspective in Fig. 9. Said pawl has in cross-section the shape of an inverted J, the large limb 106 of which is of sufficient length at least to come on a level, when the lever is in the inoperative position, with the surface of the plate 40 which is opposite the bottom 14. The width of the end of said limb forming a pawl proper is substantially equal to the distance between the flanks of two adjacent teeth 83 and 84 so that said end when inoperative occupies the space between two teeth (Fig. 9), or between one of the teeth 84 and 85 and the end of the notch 80, as shown in Fig. 4.

This same large limb 106 has two lateral notches 110, 111 at its part which passes through the metal sheet of the lever 91 and which hold the pawl in position, in order to enable it to swing. At the end of the small limb of said J, bears a spring 114 in contact on the other hand with the surface of the lever 91 and urging same in the direction which bears the pawl on the surface 81. Said spring 114 is held by two projections 116 and 117 respectively at the end of the limb 113 and on the lever 91 at the end of the opening 102.

A leaf spring 120 has two arms which are adapted to co-operate with the cheeks 93 and are pressed, when inoperative, on symmetrical stops 122 (Fig. 5) which are fixed in the cover 124 of the case 1 and determine the inoperative position of the lever 91, said spring being furthermore held at its apex by projections 125 and 126 on the case 1 and the cover 124.

The cover, which is shown from underneath in Fig. 5 with the lever 91 in chain dotted lines, is fixed by a screw 128 co-operating with an axial hole of the pivot 89 and serves at the same time for holding the spring 92 in position.

A window 129, which is visible in Fig. 10, is provided in the case 1 and enables the inscriptions or other marks placed on the edge of the plate 40 to be seen, so that the driver may be informed of the position of the latter.

The operation of this arrangement is as follows:

When the lever is moved in the direction of the arrow f from the position shown in Fig. 4, it rotates about the pivot 89 and, through the instrumentality of the pawl 105 which is in contact with the edge 88, rotates the movable plate 40 about the axis 15 until said lever abuts against the case at 98, which corresponds to the displacement of the ball 44 from the notch 42a to the next notch 42b. At this instant, the pawl is inclined relatively to the bottom of the tooth since it has rotated about an axis which is much more remote from it than the axis 15. The lever is then brought back in the opposite direction to the arrow f by the spring blade 120 without the pawl engaging the tooth 85, said pawl yielding by swinging against the action of the spring 114 as it passes over said tooth. It is consequently obvious that the lever returns to its normal position and that the pawl places itself between the two following teeth 83 and 85.

A further rotation of the lever through the same angle in the direction of the arrow f moves the movable plate 40, through the instrumentality of the pawl 108 which is in contact with the tooth 85, until the ball 44 is displaced from the notch 42b to the next notch 42c, and the arrangement is then in the position shown in Fig. 6, which clearly shows the slope of the pawl 108 relatively to the toothing making it possible for the lever to return to the inoperative position responsive to the spring 120, without being prevented by the tooth, and the pawl places itself between the two teeth 83 and 84.

The plate 40 may be returned to its initial position by rotating the lever in the opposite direction from its inoperative position.

It will therefore be seen that the lever enables the plate to be brought into each of its positions a, b, c, d from the adjacent position by swinging the lever in either direction. The lever returns to its initial position after each control has been effected.

The blades 49 and 50 correspond to the permanent lighting and are inoperative in the position a, whereas in the positions b, c, d, the blade 49 connects the battery to the permanent rear lighting and the plate 50, through the plate 35 and the contact 37—69, places the battery successively in contact with the town lamps, the courtesy headlights and the road headlights. The blade 48 forms part of the battery-town warning signal circuit (closed through the push button contact 78-plate 68) and, in the positions a, b, c, d successively connects it to the sound signal (if it exists), the courtesy headlights, the road headlights and the courtesy headlights.

Said warning signal is obtained by pressing the lever 94 in the direction of the arrow F (Fig. 1).

The movement of the lever in the recess 100 is first of all a rotation about its bearing point 101 at the end of the case, which rotation is permitted by the clearance of the hole 90 about the pivot 89, the spring 92 then being slightly compressed. During said rotation, said lever moves the push button 76 until its part 78 is in contact with the plate 68. This movement has the effect of pulling the resilient blade 35 out of contact with the plate 69, breaking the corresponding contact 37—69 and substituting therefor the connection of the battery with the contact blade 48 (through the intermediary of the push button 76, the plate 68 and its extension 70). The permanent lighting, if it exists, is cut off at the same time as the contact 37—69 is broken and a warning signal, optionally either a sound signal, or a luminous signal, and different from the previously existing permanent lighting, is set up through the blade 48 while said lever is kept in the aforesaid position.

The contact of the push button 76 with the plate 68 limits the movement of the lever 91 in the direction of the arrow F by rotating about its end. By pressing harder on said lever, it is caused to rotate against the action of the spring 92 about its point of contact 97 with the push button 76, which requires a distinctly greater force and causes the blade 36 to be pressed by the end of the pawl 106 against the screw 23, that is to say connects the battery with the road sound warning signal.

This displacement to the road warning position which the user cannot effect unintentionally, maintains the sound or luminous town warning signal in the working position into which it has already been brought by the push button.

With reference to Figs. 11 and 12, an auxiliary switch has furthermore been shown, said auxiliary switch being intended to control the left hand and right hand luminous signals and also the parking lights which are in general intended to be lit on both sides of the vehicle when the latter is running at night, and on only one side of the vehicle when same is standing at night.

Said auxiliary switch has six friction contacts, four of which 141, 142, 143 and 144 are formed by the projecting heads of screws which are fixed on the bottom 14 and connected respectively to the left and right hand parking lights and to the left and right hand luminous signal indicators, and the two other friction contacts 145 and 146 are fixed respectively on the screw heads 17 and 18 which, as stated above, are connected to the battery and to the permanent rear lighting.

Against said six friction contacts is pressed by a spring 150 a rotating plate 151 mounted in a guide 156 which is concentric with the axis 15 and is arranged in a case 153 which is fixed by a screw 154 to the case 1. The spring 150 is arranged between the bottom of the case 153 and the face of the plate 151 opposite that which is in contact with the friction contacts.

The movable plate 151 can rotate on itself responsive to the action of a handle 160 which is parallel with the handle 94 and which can be brought into any one of five positions called respectively zero, 1 and 2 left, 1 and 2 right, said five positions being defined by five recesses 162, 162d, 162d', 162g, 162g' provided in plate 151 and similar to the recesses 42 provided in the plate 14 and against which is pressed a ball 163 by a spring 164, disposed in a housing carried by the bottom of case 153.

The surface of the plate 151 is in contact with the friction contacts through the intermediary of two plane brass conducting parts 168 and 169 which cover said plate in part and the shape of which is shown in Fig. 12 wherein a circle in chain dotted lines 172 shows the path followed by the friction contacts 141 and 142 and the circle 173 the path followed by the friction contacts 143 and 144 during the rotation of the plate 151 about the axis 15.

Each of said two parts 168 and 169 has a central disc-shaped part on which respectively bear the friction contacts 146 and 145 for all the positions of the plate 151 and two projecting wings 178, 179 and 180, 181 respectively. The part 169 furthermore has an additional wing 183 which, in the inoperative position is symmetrical with respect to the axis 189 corresponding to the zero position of the lever 160.

In Fig. 12, the position of the friction contacts corresponding to the zero position of the lever has been shown in continuous lines, that is to say corresponding to the ball 133 in the medial notch 162, and in chain dotted lines with the indices $g$ and $g'$ and $d$ and $d'$ the positions of said friction contacts, relatively to the plate 151, corresponding to the ball in the notches 162$g$, 162$g'$, 162$d$ and 162$d'$.

It will be seen that in the positions $g$ and $d$ of the plate 151, the friction contacts 141 and 142 remain in contact with the wings 178 and 179 respectively of the part 168 and either one respectively of the friction contacts 143 and 144 come into contact with the wing 183 of the part 169. In the position $g'$, the friction contacts 143 and 144 are not in contact with the parts 168 and 169 and the friction contact 141 is in contact with the wing 180. Similarly, in the position $d'$, the friction contact 142 is alone in contact with the plate 169 through the intermediary of the wing 181.

The operation under these conditions will immediately be understood:

The parts 168 and 169 are connected to the rear lighting and to the battery respectively through the intermediary of the friction contacts 146 and 145. Under these conditions, either one of the friction contacts 143 and 144 is placed in connection with the battery through the intermediary of the part 169 in the positions $g$ and $d$ and, consequently either one of the direction indicators is energized.

On the other hand, in the zero positions, $g$ and $d$, of the plate 151, the two friction contacts 141 and 142 remain in contact with the part 168 and consequently connected to the permanent rear lighting. The parking lights are thus lit at the same time as the rear lighting of the vehicle for running at night.

In the positions $g'$ and $d'$ of the plate 151, either one of the friction contacts 141 and 142 is directly connected to the battery through the intermediary of the wings 180 and 181 respectively of the part 169 and, consequently, either one of the parking lights is lit, thereby corresponding to the standing of the vehicle at night, the other lighting systems being extinguished.

The arrangement which has just been described is applicable to the case in which the two parking lights have to be alight at night when the vehicle is running.

In the case in which the parking lights only have to operate when the vehicle is standing still, the part 168 is useless and its elimination precludes at the same time any possibility of lighting said lights elsewhere than in the positions $g'$ and $d'$ of the lever.

The apparatus can moreover be modified so as to only control the parking lights, the number of positions of the plate 151 being in that case reduced to three.

While I have described what I at present consider a preferred embodiment of my invention, it will be obvious to those skilled in the art that various changes and modifications may be made without departing from my invention and I therefore aim in the appended claims to cover all such changes and modifications as fall within the true spirit and scope of my invention.

What I claim is:

1. An electrical switch comprising supporting means, a fixed plate carried by said supporting means, a movable plate, means mounting said movable plate for rotation about an axis to occupy with reference to said fixed plate a number of angular positions, cooperating contact members carried by said plates, a control lever, means mounting said control lever for rotation from its inoperative position in one or the other direction about an axis substantially parallel with the first mentioned axis through an angle corresponding to the rotation of said movable plate from one position to the following one, a ratchet connection between said movable plate and said lever whereby said movable plate is adapted to be driven in one or the other direction by rotation of said lever in the same direction and from its inoperative position, and resilient means urging said lever to its inoperative position to which it is returned after each movement.

2. An electrical switch comprising supporting means, a fixed plate carried by said supporting means, a movable plate, means mounting said movable plate for rotation about an axis to occupy with reference to said fixed plate a number of angular positions, cooperating electrical contact members carried by said plates, a control lever, a ratchet connection between said lever and said movable plate to rotate said latter in one and the other direction, said connection including a pawl carried by the control lever and a toothing carried by the movable plate and arranged concentrically to said axis, means mounting said control lever for rotation in one or the other direction about an axis substantially parallel with the first mentioned axis and laterally thereof to allow said lever to return freely to its inoperative position after the drive of said movable plate from one position to the following one and resilient means urging said lever in its inoperative position.

3. An electrical switch as claimed in claim 2, in which said toothing includes two end teeth and an intermediate tooth, said intermediate tooth being provided with lateral surfaces adapted to cooperate with said pawl for the driving of said movable plate in different directions.

4. An electrical switch as claimed in claim 2, in which said pawl is swingably carried by said lever and includes resilient means carried by said lever and urging said pawl in the direction of said toothing.

5. An electrical switch including supporting means, a fixed plate carried by said supporting means, contact studs carried by said plate, a movable plate mounted for rotation about an axis and thus adapted to occupy a number of angularly spaced positions with reference to said fixed plate, spring blades carried by said movable plate and adapted to engage selectively said studs, ratchet teeth carried by said movable plate and arranged on at least one circular surface substantially coaxial with the axis of the movable plate, a lever adapted to rotate about a further axis, the distance between said further axis and said circular surface being greater than the distance between said circular surface and said first named axis, a pawl member resiliently carried by said lever and arranged to form with said teeth a ratchet arrangement and resilient means urging said lever in the direction of its inoperative position.

6. An electrical switch as claimed in claim 5, wherein at least the one intermediate tooth of said ratchet teeth is provided with substantially symmetrical flanks adapted to cooperate with said pawl member for the driving of said movable plate in one and the other direction and in which the outer flank of each extreme tooth of said ratchet teeth is inclined in the direction of said intermediate tooth to prevent the pawl member from engaging it.

7. An electrical switch including a fixed plate, a movable plate adapted to rotate with reference to said fixed plate, cooperating contact members carried by said plates, a control lever mounted to oscillate from its inoperative position in two planes, a ratchet arrangement between said control lever and said movable plate for controlling the rotation of said latter in one and the other direction by said lever being displaced in one of said planes, contact making means arranged in front of the inoperative position of said lever and adapted to be operated by said lever being imparted a predetermined displacement in the other of said planes.

8. An electrical switch as claimed in claim 7 in which the said contact making means are resiliently biased towards their opened position and including a connection between a contact member carried by the said movable plate and a contact member carried by the fixed plate, further contact making means in the said connection, the said further contact making means being resiliently biased towards their closed position, a mechanical connection between the said contact making means arranged to open the said further contact making means responsive to the closure of the said first named contact making means.

9. An electrical switch including a fixed plate, a movable plate mounted to rotate with reference to the said fixed plate, cooperating contact members carried by the said plates, a control lever mounted to oscillate from its inoperative position in two planes, a ratchet arrangement between the said control lever and the said movable plate for controlling the rotation of the said plate in one and the other direction by the said lever being displaced in one of the said planes, a resilient contact blade carried by the said fixed plate, a contact blade carried by the movable plate to form contact making means with the said resilient blade, a contact piece formed by a push button movably carried by the said movable plate and in contact with the said resilient blade, a further contact plate carried by the said movable plate to form further contact making means with the said contact piece, the said resilient blade being arranged to close the said first named contact making means and push the said contact piece towards its inoperative position, and the said lever being arranged when imparted a predetermined displacement in the other of the said planes to impart to the said contact piece an operating stroke against the said resilient blade thus opening the said first named contact making means and closing the said further contact making means.

10. In an electrical switch as claimed in claim 9, a supporting pivot rigid with the said fixed plate, one end of the said control lever being provided with a hole threaded on the said pivot, resilient means pushing the said end of the said lever in the direction of the operating stroke of the said contact piece, still further contact making means in front of the inoperative position of the control lever, a projection carried by the said lever in front of the said still further contact making means, the said lever being arranged after having been swung in the other of the said planes substantially about its end to impart to the said contact piece its operating stroke, to swing about its contact point with the said contact piece in its operative position and against the said last named resilient means to operate the said last named contact making means through the said projection.

11. An electrical switch as claimed in claim 7 including further contact making means mounted in front of the inoperative position of the said control lever and mounted to be actuated by said lever being imparted a further displacement in the said other plane after the said predetermined displacement.

HENRI PAUL MARCEL QUILLERY.